United States Patent [19]

Fukukawa et al.

[11] Patent Number: 4,904,107
[45] Date of Patent: Feb. 27, 1990

[54] BALL JOINT AND ITS MANUFACTURING METHOD

[75] Inventors: Takao Fukukawa; Masahiro Yamada, both of Shizuoka, Japan

[73] Assignee: Ishikawa Tekko Kabushiki Kaisha, Tokyo, Japan

[21] Appl. No.: 285,748

[22] Filed: Jul. 15, 1988

[30] Foreign Application Priority Data

Dec. 25, 1987 [JP] Japan .................. 62-329179

[51] Int. Cl.$^4$ .................. F16C 11/00; B21D 53/10
[52] U.S. Cl. .................. 403/122; 403/135;
403/140; 403/274; 29/512; 29/898.06
[58] Field of Search .................. 403/135, 140, 134, 71,
403/39, 133, 122, 274; 29/149.5 B, 441.1, 512;
264/249; 384/203, 206, 207, 208, 213, 295, 297

[56] References Cited

U.S. PATENT DOCUMENTS 3,506,290  4/1970  Gottschald .................. 403/134
3,626,566 12/1971  Kilgour .................. 29/149.5 B
4,479,915 10/1984  Tsubouchi et al. .................. 403/261 X

FOREIGN PATENT DOCUMENTS 943862 12/1963 United Kingdom .......... 29/149.5 B

Primary Examiner—Andrew V. Kundrat
Assistant Examiner—Franco Deliguori
Attorney, Agent, or Firm—James E. Nilles; Donald C. McGaughey

[57] ABSTRACT

A ball joint wherein a global head of a ball stud is covered with a bearing seat made of a hard synthetic resin so that the global head is movable in the bearing seat, a shank formed integral with the ball stud is projected from the global head, the bearing seat with the ball stud is pressed into a housing having openings at both ends, so that the shank of the ball stud is projected out of the opening at one end of the housing, engagement portions at both ends of the bearing seat are brought into engagement with the corresponding ends of the housing, and at least one of the engagement portions of the bearing seat is heated and caulked over the corresponding end of the housing to securely fix the bearing seat to the housing.

5 Claims, 2 Drawing Sheets

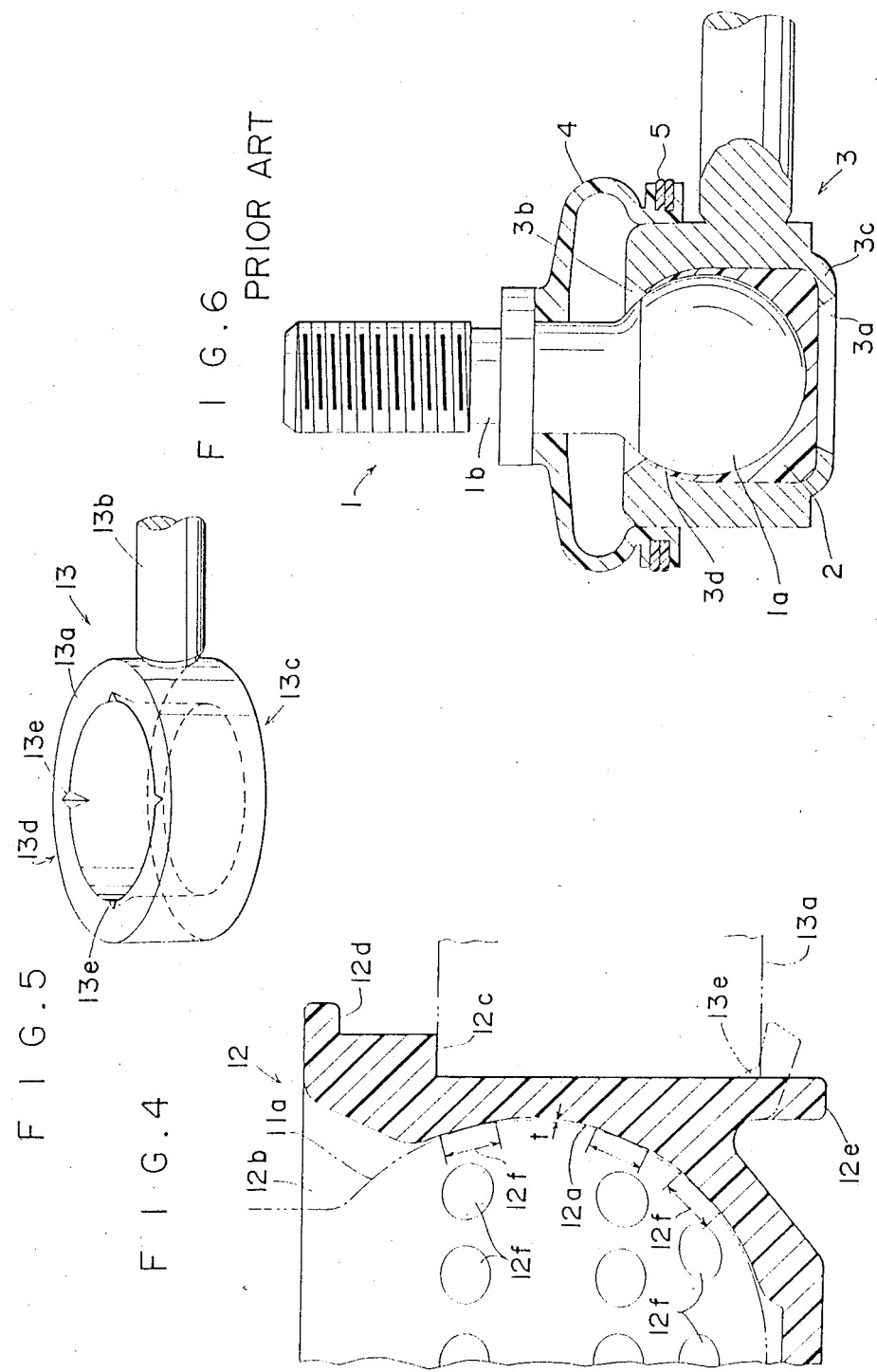

BALL JOINT AND ITS MANUFACTURING METHOD

BACKGROUND OF THE INVENTION

1. Field of the Invention

This invention relates to a ball joint and a method of manufacturing the ball joint used on joints in automotive steering mechanisms and suspension mechanisms.

2. Description of the Prior Art

Ball joints used on joints of automotive steering mechanisms and suspension mechanism are required to have a proper level of rigidity and be able to oscillate and swivel smoothly. To meet these requirements, the ball joints of a conventional type generally have the following construction, though it increases the manufacturing cost. A global head of a metal ball stud, which has a shank integrally formed therewith and projecting from the head, is slidably contained in a bearing seat made of hard synthetic resin. The bearing seat is pressed into a metal housing from a first opening at one end of the housing. The shank of the ball stud is allowed to project out of a second opening at the other end of the housing. A metal plug is caulked over the first opening of the housing to hold the bearing seat, together with the global head of the ball stud, in the housing. A rubber dust seal is mounted to cover an area between the other end of the housing and the shank of the ball stud. This dust seal is secured to the housing by a metal clip.

To lower the cost of the ball joints of this type, a construction as shown in FIG. 6 is currently employed. A global head 1a and a metal ball stud 1, which has a shank 1b integrally formed therewith and projecting from the head 1a, is slidably contained in a bearing seat 2 made of hard synthetic resin. This bearing seat 2 is pressed into a metal housing 3 from an opening 3a at one end of the housing 3. The shank 1a of the ball stud 1 is allowed to project out of a second opening 3b b at the other end of the housing 3. A thin engagement portion 3c provided outside the first opening 3a of the housing 3 is caulked over the bearing seat 2 to hold the bearing seat 2, together with the global head 1a of the ball stud 1, in the housing 3, without using a plug. A rubber dust seal 4 is used to cover the area between the other end of the housing 3 and the shank 1b of the ball stud 1. The dust seal 4 is secured to the housing by a metal clip 5.

In the conventional ball joint of FIG. 6, the plug is eliminated and the cost is reduced accordingly. However, the housing 3 still remains as complicated in structure as when a plug is used, and also requires a dome-shaped hollow portion 3d to be formed inside the housing 3 near the other end and the thin engagement portion 3c to be formed at one end of the housing. This requires cutting processes for manufacture.

SUMMARY OF THE INVENTION

This invention has been accomplished to overcome the above drawbacks. An object of the invention is to simplify the structure of the housing and achieve a further reduction in cost in the ball joints which have no plug.

A ball joint of this invention comprises: a housing having an opening at each end; a ball stud having a global head and a shank, formed integral as one piece, the global head being disposed inside the housing, the shank projecting out of an opening at one end of the housing; and a bearing seat formed of hard synthetic resin, the bearing seat slidably containing the global head of the ball stud, the bearing seat being pressed into the housing; wherein engagement portions that engages both ends of the housing are formed at both ends of the bearing seat.

A ball joint manufacturing method according to this invention comprises the steps of: putting a global head of a ball stud in a bearing seat made of a hard synthetic resin so that the global head is movable in the bearing seat, the ball stud having a shank formed integral therewith and projecting from the global head, the bearing seat having engagement portions at both ends; pressing the bearing seat into a housing which has openings at both ends; allowing the shank of the ball stud to project out of the opening at one end of the housing; engaging the engagement portions at both ends of the bearing seat with the corresponding ends of the housing; and heating and caulking at least one of the engagement portions of the bearing seat over the corresponding end of the housing to securely fix the bearing seat to the housing.

In the ball joint of this invention, the engagement portions formed at both ends of the bearing seat made of an easily formed synthetic resin are engaged with each end of the housing, so that there is no need to form a dome-shaped portion in the housing or thin engagement portions on it, allowing the housing to be formed in a simple shape, which in turn makes manufacture of the housing easy and reduces the manufacturing cost.

According to the ball joint manufacturing method of this invention, the engagement portion of the bearing seat made of a synthetic resin is heated and caulked over the end of the housing, so that the calked engagement portion is prevented from becoming brittle and therefore has a high strength as when it is directly formed into an after-caulking shape. Thus, the housing can securely be fixed to the bearing seat.

These and other objects and features of this invention will be described by referring to accompanying drawings.

BRIEF DESCRIPTION OF THE DRAWINGS

FIG. 4 is a partially enlarged cross-sectional view of a bearing seat of the ball joint;

FIG. 5 is a perspective view of a housing of the ball joint; and

FIG. 6 is a prior art partial cross-sectional view of a conventional ball joint.

PREFERRED EMBODIMENT OF THE INVENTION

A ball joint and a method of manufacturing the ball joint as one embodiment of this invention will be described by referring to FIGS. 1 through 5.

Figure 3:
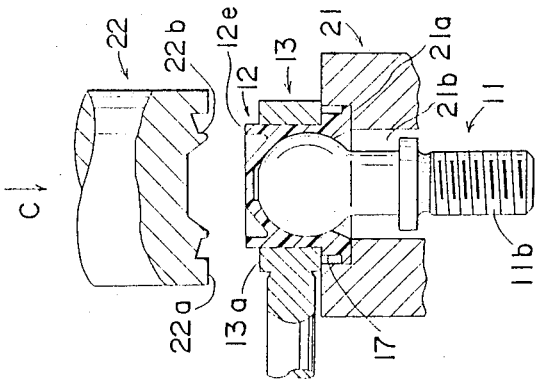
FIG. 3 is a partial cross-sectional view of the assembled ball joint.
Figure 2:
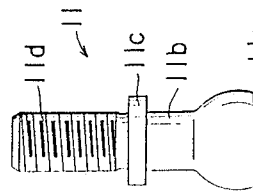
FIG. 2 is an exploded view of the ball joint.
Figure 2:
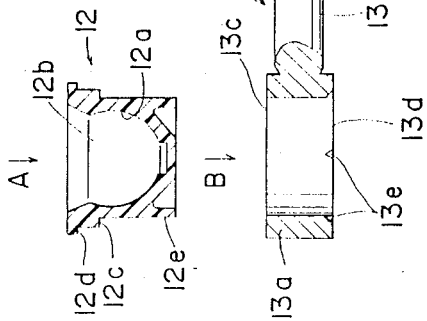
Figure 1:
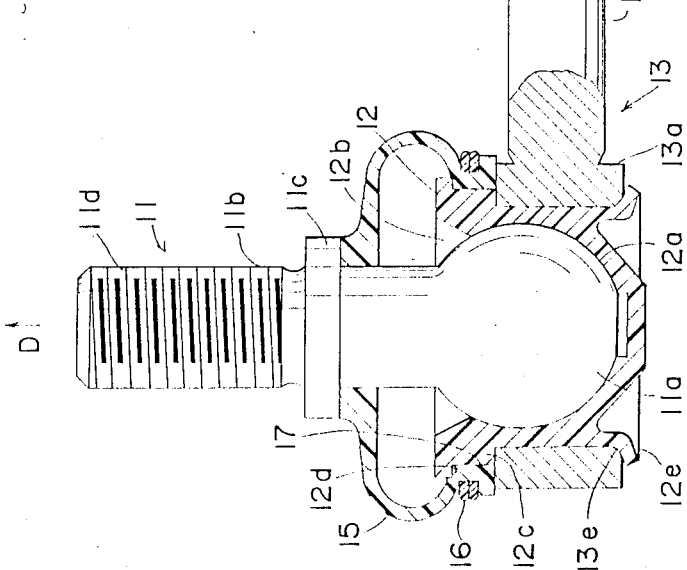
FIG. 1 is a partial cross-sectional view of a ball joint as one embodiment of this invention.

In FIGS. 1 to 3, reference numeral 11 denotes a metal ball stud which consists of a global head 11a, a shank 11b integrally formed with the head 11a, and a flange 11c formed on the outer circumference of the intermediate portion of the shank 11b. A portion of the shank 11b beyond the flange 11c is formed at the outer circumference with threads 11d so that the shank 11b can be screwed into to her members.

Designated 12 is a bearing seat formed of a hard synthetic resin such as polyacetal resin that is selflubricating and has a high load resistance and a small friction coefficient. The bearing seat 12 is shaped like a cylinder with a bottom and has a hollow global portion 12a formed therein which complements the global head 11a of the ball stud. The bearing seat 12 has an opening 12b at one end for the shank 11b of the ball stud 11. The inner diameter of the opening 12b is smaller than the outer diameter of the global head 11a but larger than the outer diameter of the shank 11b.

On the outer circumference of the bearing seat 12 at one end on the side of the opening 12b are formed two engagement steps 12c, 12d of different outer diameters. At the other end is formed a cylindrical engagement edge 12e. The engagement edge 12e and the engagement step 12c form engagement portions that hold the ends of a housing 13 described later.

On the inner surface of the hollow global portion 12a of the bearing seat 12 is formed, as shown in FIG. 4, a large number of circular flat portions 12f which are formed by making parts of the global surface flat. The housing 13 is a metal housing which consists of a short cylindrical body 13a with both openings 13c, 13d open to accommodate the bearing seat 12 and a shaft 13b integrally formed with one side of the body 13a to mount the housing to other members. The inner diameter of the housing body 13a is slightly smaller than the outer diameter of the bearing seat 12.

As shown in FIG. 5, the housing body 13a has a plurality of engagement recesses 13e formed on the inside of the opening 13d at an end that faces the engagement edge 12e of the bearing seat 12.

In FIG. 3, denoted 21 is a receiving jig and 22 a caulking jig. The receiving jig 21 has a recess 21a formed on its upper surface, in which the end of the bearing seat 12 on the opening 12b side is engaged. At the center of the recess 21a is formed a through-hole 21b into which the shank 11b of the ball stud 11 is inserted. The caulking jig 22 is mounted, together with the receiving jig 21, on a press and moves up and down relative to the upper surface of the receiving jig 21. At its lower end the caulking jig 22 has a circular pressing projection 22a that engages with the end of the housing body 13a disposed close to the engagement edge 12e of the bearing seat 12. Also formed at the lower end of the caulking jig 22 so as to be concentric with the pressing projection 22a is a circular forming projection 22b that bends the engagement edge 12e of the bearing seat 12 outwardly.

The forming projection 22b of the caulking jig 22 is heated to a temperature about 5° lower than the melting temperature of the synthetic resin that forms the bearing seat 12.

The ball joint is assembled as follows. The global head 11a of the ball stud 11 is pressed, in the direction of arrow A of FIG. 2, into the hollow global portion 12a of the bearing seat 12 through the opening 12b at one end. Then, as indicated by arrow B of FIG. 2, the bearing seat 12 containing the global head 11a of the ball stud 11 is pressed into the body 13a of the housing 13 from the side of the engagement edge 12e so that the engagement edge 12e projects out of the opening 13d of the housing body 13a which is formed at the end where the engagement recesses 13e are formed, and until the engagement step 12c of the bearing seat 12 engages the end of the housing body 13a on the opening 13c side. Then, as shown in FIG. 3, the shank 11b of the ball stud 11 that protrudes from the bearing seat 12 fitted inside the housing body 13a is inserted into the through-hole 21b of the receiving jig 21. The end of the bearing seat 12, on the opening 12b side is placed in contact with the recess 21a of the receiving jig 21. Then, the caulking jig 22 is lowered, as indicated by arrow C, onto the bearing seat 12 and the housing body 13a placed on the upper surface of the receiving jig 21. As a result, the forming projection 22b of the caulking jig 22 bends the engagement edge 12e of the bearing seat 12 outwardly until it is caulked over the end of the housing body 13a on the opening 13d side. At the same time, the pressing projection 22a of the caulking jig 22 engages the end of the housing body 13a on the opening 13d side. This, as shown in FIG. 1, causes the engagement step 12c of the bearing seat 12 at one end and the bent engagement edge 12e at the other end to clamp the housing 13 from both ends, thus holding the three members—ball stud 11, bearing seat 12 and housing 13—together.

Since during caulking the forming projection 22b of the caulking jig 22 is heated to a temperature about 5° C. below the melting temperature of the synthetic resin which forms the bearing seat 12, the engagement edge 12e of the bearing seat 12 caulked over the end of the housing body 13a on the opening 13d side will not become brittle after caulking. The caulked engagement edge 12e maintains as high strength as when it is directly formed into an after-caulking shape of FIG. 1 and thus can securely fix the housing 13 against a load acting in the direction of arrow D of FIG. 1.

The caulked engagement edge 12e of the bearing seat 12 also bites into the plurality of engagement recesses 13e in the housing body 13a, holding the bearing seat 12 and the housing 13 firmly together, which eliminates the possibility of one member slipping or rotating relative to the other.

In the ball joint assembled in this way, a large number of circular flat portions 12f formed on the hollow global portion 12a of the bearing seat 12 are pressed resiliently against the global head 11a of the ball stud 11, so that when the shank 11b of the ball stud 11 moves relative to the shaft 13b of the housing 13, a smooth sliding motion with an appropriate rigidity or resistance is provided between the hollow global portion 12a and the global head 11a.

Gaps t between the global head 11a of the ball stud 11 and the hollow global portion 12a of the bearing seat 12 (in this embodiment, 0.05 mm) holds lubricating oil, preventing the head 11a from getting stick in the hollow portion 12a, when their sliding motion is performed at high frequency.

The assembly of ball stud 11, bearing seat 12 and housing 13 is removed from the receiving jig 21 by raising the caulking jig 22 as FIG. 3. And then a dust seal 15 made of rubber is installed between the end of the housing body 13a on the opening 13c side and the flange 11c on the shank 11b of the ball stud 11. The end of the dust seal 15 is fixed by a metal clip 16 in a groove 17 formed between the end of the housing 13 on the opening 13c side and the engagement step 12d of the bearing seat 12.

Although this embodiment has only one end of the bearing seat 12 caulked over the end of the housing 13, it is possible to caulk both ends of the bearing seat 12 over the ends of the housing 13.

The advantages of the ball joint of this invention may be summarized as follows. Since the engagement portion formed at each end of the bearing seat, which is made of an easily formed synthetic resin, is made to engage each end of the housing, there is no need to form a dome-shaped portion or thin engagement portions on the housing. This permits the housing to be formed in a simple shape, making the manufacture of the housing easy, reducing cost.

The ball joint manufacturing method of this invention involves heating the engagement portion of the synthetic resin bearing seat during the process of caulking the engagement portion over the end of the housing. This prevents the caulked engagement portion from becoming brittle, so that the caulked engagement portion maintains as high strength as when it is directly formed into an after-caulking shape. Thus, the housing can be firmly fixed to the bearing seat.

What is claimed is:

1. A ball joint comprising:
   a housing including spaced apart ends and an inside surface that defines an opening extending through said housing from one of said ends to the other of said ends;
   a plurality of engagement recesses on said inside surface;
   a ball stud having a global head and an integral shank extending therefrom, said global head being disposed in said opening inside of said housing with said shank projecting out of said opening at one of said ends of said housing; and
   a bearing seat formed of a hard synthetic resin inserted in said opening between said inside surface of said housing and said global head of said ball stud, said bearing seat having an engagement portion that engages said engagement recesses, said engagement portion being caulked over at least one of said housing ends and forced into bitting engagement with said engagement recesses to secure said bearing seat against rotation relative to said housing.

2. A ball joint according to claim 1 wherein said inside surface intersects with at least one of said housing ends along an inner peripheral edge, wherein said engagement recesses comprise a plurality of recesses located in said inner peripheral edge, with each of said recesses opening onto both said inside surface and one of said housing ends; and wherein said engagement portion of said bearing seat projects out of said one end and is caulked over said inner peripheral edge into bitting engagement with said engagement recesses.

3. A method of manufacturing a ball joint of the type that includes a housing having spaced apart ends, an inside surface defining an opening extending through said housing from one of said ends to the other, a plurality of engagement recesses on said inside surface, a ball stud having a global head and an integral shank extending therefrom, and a bearing seat having a hollow global head receiving portion and spaced apart seat ends each having an engagement portion, said method comprising the steps of:
   A. pressing said global head into said hollow global head receiving portion of said bearing seat and allowing said shank to project outwardly therefrom:
   B. pressing said bearing seat and head into said opening of said housing and causing said engagement portion to project out of said opening at least at one end of said housing; and
   C. securing said engagement portion with said end of said housing adjacent thereto by heating and caulking at least one of said engagement portions of said bearing seat over said end adjacent thereto to cause said engagement portion to bite into said engagement recesses of said housing to securely fix said seat to said housing.

4. A method according to claim 3 wherein said inner surface intersects with said housing end along an inner peripheral edge with said engagement recesses being in said peripheral edge, and wherein said engagement portions includes an engagement step larger than said opening and an engagement edge spaced from said engagement step that is dimensioned to pass through said opening, said method further comprising;
   in step B, pressing said bearing seat into said opening until said engagement step contacts one end of said leading and said engagement edge extends through said opening beyond said inner peripheral edge at said other end of said housing; and
   in step C, caulking said engagement edge over said inner peripheral edge adjacent thereto containing said engagement recesses to cause said engagement edge to bite into said engagement recesses.

5. The ball joint manufacturing method according to claim 3, wherein said heating temperature is lower by several degrees than the melting temperature of the synthetic resin that forms said bearing seat.

* * * * *